W. H. RICE.
AGRICULTURAL IMPLEMENT.
APPLICATION FILED JULY 18, 1912.
1,081,915.
Patented Dec. 16, 1913.
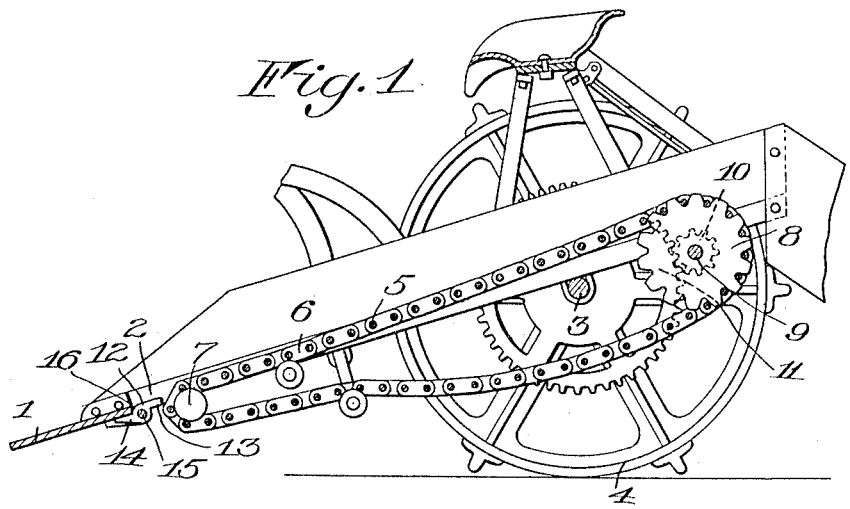
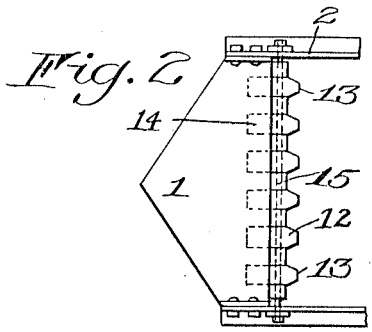
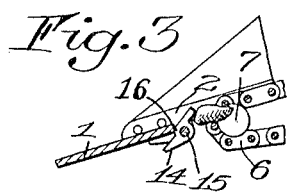
Inventor
William H. Rice
Witnesses

UNITED STATES PATENT OFFICE.

WILLIAM H. RICE, OF ROCHESTER, NEW YORK.

AGRICULTURAL IMPLEMENT.

1,081,915.  Specification of Letters Patent.  Patented Dec. 16, 1913.

Original application filed September 15, 1909, Serial No. 517,841. Divided and this application filed July 18, 1912. Serial No. 710,207.

*To all whom it may concern:*

Be it known that I, WILLIAM H. RICE, of Rochester, in the county of Monroe and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

The present invention relates to agricultural implements, and more particularly to potato diggers of the type embodying, generally, an excavator or shovel at the forward end, an endless conveyer extending upwardly from the rear end of the shovel, and a run way at the rear end of the conveyer through which the potatoes are discharged, and it has for its object to provide a novel construction for closing the space between the forward end of the conveyer and the rear end of the shovel, in a manner that will enable the material received by the shovel to pass readily onto the conveyer, and at the same time prevent the machine from being clogged by material carried upwardly from the lower lap of the conveyer.

A further object of the invention consists in providing a series of yielding gates for the purpose mentioned, these being constructed and arranged in such a manner that when in their normal position they form a substantially continuous surface between the shovel and the conveyer.

To these and other ends the invention consists in certain improvements and combinations of parts all as will be hereinafter more fully described, the novel features being pointed out in the claims at the end of the specification.

In the drawings: Figure 1 is a longitudinal sectional view of a potato digger embodying a preferred arrangement of the invention; Fig. 2 is a plan view of the shovel and the yielding gates arranged in proximity thereto, and Fig. 3 is a vertical section taken through the shovel and the conveyer.

Similar reference numerals throughout the several figures indicate the same parts.

The subject matter of this invention is a division of an application filed by me September 15, 1909, Serial No. 517,841, resulting in Patent No. 1,034,734, Aug. 6, 1912, the latter having been divided from an application filed by me and on which Letters Patent No. 934,934 issued September 21, 1909, the last mentioned application having been a division of an application filed by me on which Letters Patent No. 980,335 issued January 3, 1911.

The invention, as herein embodied, comprises an excavator or shovel 1 adapted to penetrate the earth, and side pieces 2 extending rearwardly and supported on the axle 3 which carries the ground wheels 4. The conveyer is arranged between the sides of the main frame, being supported at its forward end in proximity to the shovel and at its rear end near the rear of the main frame, and comprises an endless chain embodying transversely extending rods arranged between the sides of the frame and connected at their ends by the links 6.

The forward end of the conveyer is preferably supported in proximity to the shovel by guiding pulleys or wheels 7, while the rear end is preferably supported by sprocket wheels 8 arranged on the transverse shaft 9 which carries the pinion 10 adapted to be driven by the gear wheel 11 on the ground wheel.

The space between the forward end of the conveyer and the rear end of the shovel is closed by a plurality of swinging gates, the upper faces of which form a continuous surface between the conveyer and the shovel, when in normal position. Each of said gates comprises an upper portion 12 tapered or reduced at its rear end, as shown at 13, and a lower portion 14 which engages under the rear end of the shovel, as shown in Fig. 1. The gates are pivotally supported on the transversely extending rod 15 which is suitably secured at its ends to the side pieces 2. The upper portions 12 of the gates are of sufficient weight to more than counterbalance the lower portions, so that the gates extend normally in a horizontal direction and connect the shovel and the forward end of the conveyer. By providing the reduced or tapered portions 13, at the rear of the gates, I overcome the possibility of earth or obstructions getting in between the adjacent gates in such a position as to prevent their proper closing, while at the same time sufficient surface is afforded to conduct the material from the shovel onto the conveyer. Curved shoulders 16 are afforded between the upper portions 12 and the lower portions 13, said shoulders being arranged to abut against the rear edge of the shovel, so as to permit the gate to turn on its pivotal axis when engaged by an obstruction carried upward from the lower lap of the conveyer, as shown in Fig. 3. The arrangement of the curved shoulder 16 and the lower portion 14 provides a unique structure which enables the gate to yield when necessary, and at the same time forms a substantially unbroken conducting surface from the shovel to the conveyer.

I claim as my invention:

1. In a digger, the combination with a shovel, of an endless conveyer operating in rear of the shovel, and a plurality of upwardly yielding gates extending from the shovel toward the conveyer and tapered at their rear ends adjacent the conveyer.

2. In a digger, the combination with a shovel, of an endless conveyer operating in rear of the shovel and a plurality of upwardly yielding gates having their upper surfaces normally in alinement with the upper surface of the shovel, said gates being tapered at their rear ends adjacent to the conveyer.

3. In a digger, the combination with a shovel, of an endless conveyer operating in rear of the shovel, and a plurality of upwardly yielding gates extending from the shovel toward the conveyer, said gates comprising upper portions, lower portions adapted to engage the under surface of the shovel, and curved shoulders connecting said lower portions and the upper portions.

4. In a digger, the combination with a shovel, of an endless conveyer operating in rear of the shovel, a plurality of upwardly yielding gates extending from the shovel toward the conveyer, said gates embodying upper portions, lower portions adapted to engage the under surface of the shovel, and curved shoulders connecting the upper and lower portions, the gates being tapered at their rear ends adjacent to the conveyer.

5. In a digger, the combination with a shovel, of an endless conveyer operating in rear of the shovel, a shaft extending transversely of the shovel, a plurality of upwardly yielding gates spaced from each other and mounted for independent movement on said shaft, the gates having upper portions adapted normally to form a continuation of the upper surface of the shovel, lower portions arranged to engage the under surface of the shovel, and curved shoulders connecting said upper and lower portions, the gates being tapered at their rear ends adjacent to the conveyer.

WILLIAM H. RICE.

Witnesses:
RUSSELL B. GRIFFITH,
NELSON H. COPP.

Copies of this patent may be obtained for five cents each, by addressing the "Commissioner of Patents, Washington, D. C."